US012585814B1

(12) United States Patent
Haslam et al.

(10) Patent No.: US 12,585,814 B1
(45) Date of Patent: Mar. 24, 2026

(54) SYSTEMS AND METHODS FOR SELECTIVELY CENSORING CONTENT IN PUBLIC LOCATIONS

(71) Applicant: United Services Automobile Association (USAA), San Antonio, TX (US)

(72) Inventors: Justin Dax Haslam, San Antonio, TX (US); Jose L. Romero, Jr., San Antonio, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 325 days.

(21) Appl. No.: 17/586,993

(22) Filed: Jan. 28, 2022

Related U.S. Application Data

(60) Provisional application No. 63/143,298, filed on Jan. 29, 2021.

(51) Int. Cl.
 *G06F 21/62* (2013.01)
 *G06F 21/84* (2013.01)
(52) U.S. Cl.
 CPC .......... *G06F 21/6245* (2013.01); *G06F 21/84* (2013.01)

(58) Field of Classification Search
 CPC ............................ G06F 21/6245; G06F 21/84
 See application file for complete search history.

(56) References Cited

U.S. PATENT DOCUMENTS

| | | | |
|---|---|---|---|
| 10,503,935 B1* | 12/2019 | Hadsall ................... | G06F 21/32 |
| 2006/0018466 A1* | 1/2006 | Adelstein ............ | H04L 63/1425 |
| | | | 380/46 |
| 2016/0314708 A1* | 10/2016 | Cohain ................... | G08B 6/00 |
| 2016/0321457 A1* | 11/2016 | Liu ......................... | G06T 11/60 |
| 2017/0124349 A1* | 5/2017 | Anantapur Bache ... | G06F 21/44 |
| 2018/0299153 A1* | 10/2018 | Ajax ..................... | G05B 13/021 |
| 2019/0166159 A1* | 5/2019 | Avrahami ........... | H04L 63/1483 |
| 2019/0377898 A1* | 12/2019 | Dunjic ............... | H04L 65/1083 |
| 2019/0392176 A1* | 12/2019 | Taron ...................... | G06F 21/32 |
| 2020/0175209 A1* | 6/2020 | Yost ...................... | G06F 21/84 |
| 2021/0004447 A1* | 1/2021 | Kosugi ................... | G06F 21/35 |
| 2021/0034384 A1* | 2/2021 | Alameh .................. | G06F 9/451 |
| 2021/0111884 A1* | 4/2021 | Nagao ................... | H04L 9/0861 |

* cited by examiner

*Primary Examiner* — Theodore C Parsons
*Assistant Examiner* — Alan L Kong
(74) *Attorney, Agent, or Firm* — Fletcher Yoder, P.C.

(57) ABSTRACT

A technique for selectively censoring sensitive information for presentation on a display of a computing device is disclosed. In some embodiments, the disclosed techniques may transmit the sensitive information after receiving an indication that the sensitive information is permitted to be displayed. In some embodiments, the sensitive information may be transmitted to an external device for viewing or listening by an authorized user.

20 Claims, 4 Drawing Sheets

SYSTEMS AND METHODS FOR SELECTIVELY CENSORING CONTENT IN PUBLIC LOCATIONS

CROSS-REFERENCE TO RELATED APPLICATION

The present disclosure claims priority to U.S. Provisional Patent Application Ser. No. 63/143,298, titled "Systems and Methods for Selectively Censoring Content in Public Locations," which was filed on Jan. 29, 2021, and which is herein incorporated by reference in its entirety for all purposes.

BACKGROUND

The present disclosure relates generally to data privacy. More specifically, the present disclosure relates to preventing third parties from viewing data presented on a computing device.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Users working remotely, whether at home or in public locations (e.g., shared workspaces, parks, restaurants, coffee shops, and on public transportation) may access certain data (e.g., image data, video data, and audio data) that includes sensitive information (e.g., work-related information, confidential information, passwords, authentication information, social security numbers, credit card information, personal information). At least in some instances, a third-party that is unauthorized to view the sensitive data may be present in the public locations and, in particular, may be in a position to view or hear (i.e., inadvertently or intentionally) the sensitive information that the user may desire to keep secret. With this in mind, improved systems and methods for protecting the information presented on a computing device is desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, the present disclosure relates to a system that includes a processor and a tangible, non-transitory, computer readable medium. The computer readable medium has instructions that cause the processor to perform operations including receiving an indication of content to be presented using the associated component of a computing device. The operations also include determining that the content comprises sensitive information. Further, the operations include collecting sensor data from one or more electronic sensor devices in response to determining that the content comprises sensitive information. Further still, the operations include determining whether the computing device is being utilized in a public location based on the collected data from the one or more electronic sensor devices. Even further, the operations include censoring at least a portion of content comprising the sensitive information to generate censored content and displaying the censored content via the associated component of the computing device.

In one embodiment, the present disclosure relates to a method. The method includes receiving, via a processor, an indication of content to be presented via an electronic device communicatively coupled to the processor. The method also includes determining, via the processor, that the content comprises sensitive information. Further, the method includes receiving sensor data from one or more sensor devices in response to determining that the content comprises sensitive information. Even further, the method includes determining, via the processor, whether the computing device is being utilized in a public location based on the sensor data. Even further, the method includes modifying, via the processor, a first format type of at least a portion of the content comprising the sensitive information to a second format type different than the first format type to generate censored content. Further still, the method includes transmitting, via the processor, the censored content to the electronic device, wherein the electronic device is configured to present the censored content.

In one embodiment, the present disclosure relates to a tangible, non-transitory, machine-readable medium comprising instructions that, when executed by a processor, cause the processor to perform operations. The operations includes receiving an indication of content to be presented via an electronic device communicatively coupled to the processor. The operations also include determining that the content comprises sensitive information. Further, the operations include collecting sensor data from one or more sensor devices in response to determining that the content comprises sensitive information. Even further, the operations include determining whether the computing device is being utilized in a public location based on the sensor data. Even further, the operations include modifying a first format type of at least a portion of the content comprising the sensitive information to a second format type different than the first format type to generate censored content. Further still, the operations include transmitting the censored content to the electronic device, wherein the electronic device is configured to present the censored content.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
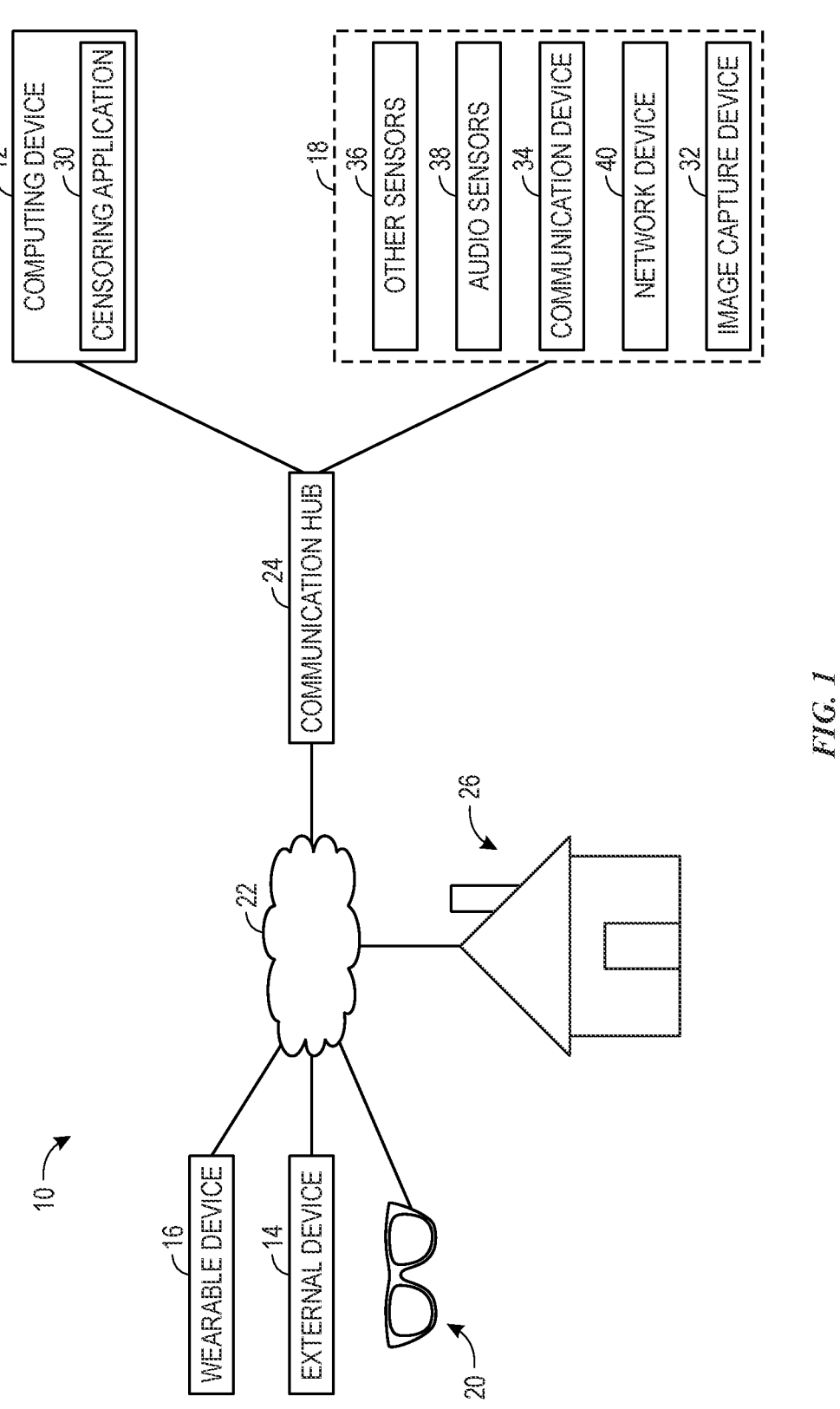
FIG. 1 is a block diagram of a private content censoring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "some embodiments", "one embodiment", or "an embodiment" of the present disclosure are not intended to be interpreted as excluding the existence of additional embodiments that also incorporate the recited features.

As used herein, the term "application" refers to one or more computing modules, programs, processes, workloads, threads, and/or computing instructions executed by a computing system. Example embodiments of an application include software modules, software objects, software instances, and/or other types of executable code.

It is presently recognized that it may be advantageous to allow or deny data that includes sensitive information (e.g., personal information of a user or other users and confidential information associated with an organization that employs the user) to be presented (e.g., displayed, output using a sound device) on a computing device associated with the user (e.g., an employee of an enterprise, a dwelling or property owner) when the user is working from home or the user in a public location (a shared workspace, a library, an airplane, a coffee shop, and other locations where people may be present). That is, controlling the presentation of certain data for the user may help improve the security related to distributing the sensitive information while still enabling the user to perform certain tasks (e.g., personal, work-related) in a less secure environment (e.g., public setting). For example, the user may be working in a coffee shop and may not desire for a person to either purposely or inadvertently view or hear sensitive information (e.g., image content and audio content) that may be presented on the user's computing device of the user.

With this in mind, embodiments of the present disclosure relate to selectively censoring sensitive information presented on a computing device. As referred to herein, "censoring" includes modifying image data, video data, and audio data (e.g., the sound output by an audio device based on the audio data) to block or prevent the sensitive information from being viewed or heard while the image data, the video data, or the audio data is being presented. For example, censoring image data and/or video data includes randomizing a portion of image data and/or video data that includes sensitive information, masking a portion of an image data and/or video data that includes sensitive information using an object (e.g., a shape, a character) that is displayed over the sensitive information, and replacing the portion of the image data that includes the sensitive information using an object such that the sensitive information is less visible (e.g., masking the sensitive information with an object have 50% opacity) or not visible to viewers. Censoring audio data includes altering a volume of the portion of the audio data that includes the sensitive information, masking the portion of audio data with another sound, removing the portion of the audio data that includes the sensitive information such that the sensitive information may not be heard, and requesting that the user receive audio data via headphones or some other suitable audio output device. By censoring or controlling the presentation of the sensitive information (e.g., output via an audio device and/or image device), a third-party may be prevented from viewing or hearing the presented image data, video data, and/or audio data when the third-party is nearby or otherwise in a position where the third-party may potentially view or hear the sensitive information.

The uncensored sensitive information (e.g., the sensitive information) may be presented to the user based on an indication that the sensitive information may be viewed by the user without compromising the security of the sensitive information. In some embodiments, the indication may be based on an input received from the user (e.g., using an input device such as a mouse, a voice command received by an audio device, a finger print, a biometric or physiological measurement) that indicates that the third-party are not in the position to potentially view or hear the sensitive information. In any case, the user may continue to perform tasks (e.g., filling out a job application, filing an insurance claim, working with confidential information) associated with the sensitive information and selectively censor, uncensor, and/or receive the sensitive information when the user deems that viewing this data does not create an opportunity for third parties to access the data. In this way, the disclosure techniques may improve the efficiency of the user working with sensitive information because the user may still receive the sensitive information to utilize for the tasks. Further, the disclosed techniques provide methods to determine when to censor, thereby protecting the privacy of the user with little to no input provided by the user. Additional details with regard to detecting that sensitive data may be at risk for exposure to a third party and automatically censoring sensitive data to prevent exposure to third parties will be discuss below with reference to FIGS. 1-8.

With the foregoing in mind, FIG. 1 is a block diagram of a content censor system 10 that includes a computing device 12, external devices 14, wearable devices 16, electronic sensor devices 18, smart glasses 20, a network 22, a communications hub 24, and the like. The computing device 12 may include an electronic device having a processor that, in some embodiments, performs one or more operations described herein. The computing device 12 may be worn, held, or associated with the owner (e.g., the user) of a property 26 (e.g., a home, an office building, a shared workspace, a coffee shop, and a library). For example, the computing device 12 may be a personal computer, laptop computer, tablet computer, smart phone, and so forth. In some embodiments, the computing device 12 may be a router or similar computer networking device. The computing device 12 includes instructions executable by the processor to censor user data received by the computing device 12 in response to detecting that an unwanted or unknown individual can view or listen to sensitive data presented via the computing device 12. As referred to herein, censoring content includes randomizing a portion of image content that includes sensitive information, masking a portion of an image content or audio content that includes sensitive information, altering a volume associated with the portion of the audio content, or masking a portion of the audio content, that includes the sensitive information, and the like.

The external devices 14 may include similar electronic devices to the computing device 12, such as a tablet computer, smartphone, and so on. As discussed in further detail with respect to FIG. 7, the external devices may receive at least a portion of the sensitive information. The wearable devices 16 may include electronic devices worn or held by the user, such as smartwatches. The wearable devices 16 may also be used to receive at least a portion of the sensitive information.

The electronic sensor devices 18 generally include devices that may generate, acquire, and/or receive sensor data (e.g., sensor image data, sensor audio data, sensor electronic data, sensor network data, temperature data, device usage data, and the like), such as an image capture device 32 (e.g., camera, video recording device, and the like) or image creation device (e.g., a display device), communications devices 34 (e.g., voice communication devices, and the like), other sensors 36 (e.g., temperature, humidity, noise/sound sensors), audio sensors 38 (e.g., microphones), network devices 40 (e.g., a gateway, a router, and the like), and other devices that may detect the movement of a user, occupancy of users, and so forth. For example, the electronic sensor device 18 may include cameras that record images within a room where a user may usually work (e.g., the user's office) or another location where the user is currently working (e.g., in a separate location from the user's office). As another non-limiting example, the electronic sensor devices 18 may include audio detectors (e.g., voice communication devices, speakers, and microphones) that may detect voices of one or more individuals within a room, such as the user and any additional users (e.g., unauthorized users) within the room. At least in some instances, the electronic sensor devices 18 may be part of the computing device 12. For example, the image capture device 32 may be a camera that is integrated into a computer or an external device that is paired with (e.g., using Bluetooth) or plugged into a suitable port (e.g., USB) of the computing device 12. As another non-limiting example, the other sensors 36 may be a temperature sensor that detects a change in the occupancy of a room based on a change in temperature (e.g., the temperature of the room may rise as additional users enter the room). Although the property 26 is illustrated as being separate from the electronic sensor devices 18, it should be noted that the electronic sensor devices 18 may be disposed inside of a structure associated with the property 26, or outside the structure and communicatively coupled to the computing device 12.

The smart glasses 20 (e.g., a VR headset, smart glasses) are generally devices that the user may wear over their eyes. In some embodiments, and as discussed in further detail with respect to FIG. 7, the smart glasses 20 may be used to display the sensitive information in a format that enables the user to view the sensitive information while prevents users who are not wearing the smart glasses 20 from having access to view the sensitive information. In some embodiments, the smart glasses 20 may display a color filter, an encryption filter, or otherwise, that, when worn by the user as the user is viewing masked sensitive content, may enable the user to view the sensitive information, which may be otherwise invisible to other users. In some embodiments, the smart glasses 20 may present a first portion of the sensitive information that, when combined with a second portion displayed on the computing device 12, may provide the sensitive information to the user. For example, the first portion may be the first 12 digits of a credit card number and the second portion may be the last 4 digits of a credit card number. As such, when the smart glasses 20 are displaying the first portion and the computing device is displaying the second portion, the user may be able to view the entirety of the sensitive information. In some embodiments, the first portion may be a fragmented portion of the sensitive information, such as a combination of pixels that, when combined with a second portion of sensitive information displayed on the computing devices, may fit together similar to a puzzle and display the entirety of the sensitive information.

As illustrated, the computing device 12 is communicatively coupled to the electronic sensor devices 18 via the communication hub 24. The communication hub 24 may be a Wi-Fi router, a smart device hub, or any other communication device that enables one or more electronic sensor devices 18 to communicate with a network 22. In general, the computing device 12 may monitor, receive, and generate data captured by the electronic sensor devices 18. The computing device 12 may store a private content censoring application 30 that filters and/or censors sensitive information that may be presented by the computing devices 12, thereby preventing unauthorized individuals from viewing the sensitive data. In some embodiments, the private content censoring application 30 may transmit the sensitive information to the external devices 14 and the wearable devices 16, where the sensitive information may be viewed more securely by the user and/or without the context of the data that is not-sensitive, as discussed in more detail with respect to FIG. 8.

In general, the private content censoring application 30 (censoring application 30) may include a software application having instructions executable by a processor of the computing device 12 to identify, intercept, and/or receive data to be presented by the user device, and censor the data. As referred to herein, censoring includes randomizing a portion of image content that includes sensitive information, masking a portion of an image content or audio content that includes sensitive information, altering a volume associated with the portion of the audio content, scrambling a portion of audio content, or removing a portion of audio content that includes the sensitive information, and any other suitable censoring methodologies and techniques. For example, the censoring application 30 may obscure data fields of a form that are displayed on the computing device 12 when the data fields are associated with sensitive information, such as personal data, credit card numbers, health information, and the like. In some embodiments, the censoring application 30 may censor the data fields using characters to replace the sensitive information (e.g., masking a social security number with "###-##-####"). In some embodiments, the censoring application 30 may censor the data fields by displaying an object (e.g., a solid block, a character) that covers up at least the sensitive information. In some embodiments, the censoring application 30 may censor the data fields by displaying false or pseudo data, such as by displaying image content or audio content having a similar format as the sensitive information. The false or pseudo data may be stored in the storage 44 (e.g., upon or prior to) displaying the sensitive information. Additionally, the false or pseudo data may be stored in the storage 44 with a timestamp or geolocation indicating where or when the false or pseudo data was generated. By linking the false or pseudo data with the timestamp or geolocation, the censoring application 30 may enable the user to determine where or when sensitive information may have been leaked. For example, if a third party uses pseudo data representing a social security number, the geolocation or timestamp of the pseudo data may indicate where the sensitive data was leaked. In this way, the use of the pseudo data may be tracked and analyzed to prevent future occurrences of sensitive information being leaked.

In some embodiments, the degree of censoring may range from relatively low amount of censoring of the sensitive information (e.g., 1%, 5%, 10%, 15%, or less than 50% of the payload, which may be at least partially decipherable) to relatively high amount of censoring of the sensitive information (e.g., greater than 50% of the sensitive information). For example, a block object may be used to censor the first five digits of a social security number that is displayed on a form. As such, the context of certain portions of the form may be retained. That is, by partially displayed the social security number, the user may understand that the form the user is looking at is associated with that social security number. In some embodiments, the censoring application 30 may scale the amount of censoring applied based on a proximity or distance between the third party and the computing device 12. That is, the amount of censoring applied to the sensitive information may vary inversely with the distance between the third party and the computing device 12. As such, the censorship levels may increase as the distance between the third party and the computing device 12 decrease. This dynamic adjustment may provide the user of the computing device 12 an indication that a third party may be attempting to gain a better view or opportunity to acquire sensitive information.

In any case, the censoring application 30 may prompt the user to provide an input (e.g., via an input device such as touchscreen, mouse, keyboard) indicating whether or not to censor the information before the user data is presented on a display of the computing device 12, such as by providing a user selectable control (e.g., a button) to censor the user data on a display of the computing device 12. In some embodiments, the computing device 12 may default to censoring the sensitive information, including a certain type of data, such as audio data, video data, and/or image capture data) unless the user has specified (e.g., via input) not to censor the information.

Additionally or alternatively, the computing device 12 may automatically determine whether or not to censor the data based on user-defined criteria and/or filter data, such as keywords indicating a type of data (e.g., image data, video data, audio data), an identifier of a company (e.g., a name, identification number, identifying string) associated with the third party, a time period, an input (e.g., text input, verbal input, and image input) indicating certain data is categorized as sensitive information (e.g., birthdays, account information, passwords, information associated with passwords), and the like. The categorization of sensitive information may be pre-defined in a database or a storage component accessible to the censor application 30. In general, the filter data and/or user-defined criteria may indicate the conditions that the user does or does not want to censor sensitive information to make the sensitive information unable to be seen or heard by third parties. For example, the user may use his or her prior knowledge of the type of sensitive information that may be presented on an email (e.g., addresses, bank account numbers), and thus, the user can provide an input indicating a pattern that the censoring application 30 may detect and censor, upon detecting the pattern. As another non-limiting example, the user may only want to filter sensitive data during the day, which may correspond to when the user is working. Accordingly, the filter data may include a time period (e.g., 9 AM to 5 PM) when the user wants to censor sensitive information. As such, the computing device 12 may censor sensitive information that may be displayed on the computing during the time period.

In some embodiments, the censoring application 30 may prompt the user to provide an input indicating the user-defined criteria. For example, in response to receiving an email, the censoring application 30 may prompt the user to provide an input indicating keywords, patterns, and/or filter data to determine whether the user data received by the computing device 12 should be censored before sensitive information is presented. In particular, when the computing device 12 receives user data that has a data size, data type, or the like that correlates to or matches the filter data provided by the user, the censoring application 30 may censor the relevant data.

Figure 2:
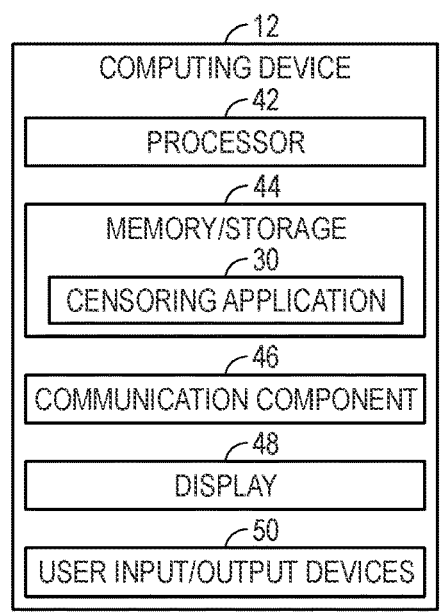
FIG. 2 is a block diagram of a computing system that may be used in conjunction with the system of FIG. 1, in accordance with embodiments described herein.

To perform one or more operations described herein, the computing device 12 may include various types of components that may assist the computing device 12 in performing the operations described below. For example, as shown in FIG. 2, the computing device 12 may include a processor 42, memory/storage 44, a communication component 46, a display 48, input/output (I/O) port 50, and the like, in accordance with embodiments described herein.

The processor 42 may be any type of computer processor or microprocessor capable of executing computer-executable code. The processes and logic flows described in this specification may be performed by one or more programmable processors executing one or more computer programs to perform functions by operating on input data and generating output. The processes and logic flows may also be performed by special purpose logic circuitry, e.g., an FPGA (field programmable gate array) or an ASIC (application specific integrated circuit). Processors suitable for the execution of a computer program include, by way of example, both general and special purpose microprocessors, and/or processor(s) of any appropriate kind of digital computer.

The memory and the storage 44 may be any suitable articles of manufacture that store processor-executable code, data, or the like. These articles of manufacture may include non-transitory computer-readable media (e.g., any suitable form of memory or storage) that may store the processor-executable code used by the processor 42 to perform the presently disclosed techniques. As used herein, applications may include any suitable computer software or program that may be installed onto the computing device 12 and executed by the processor 42. It should be noted that non-transitory merely indicates that the media is tangible and not a signal. As illustrated, the memory and/or the storage 44 may store the presented content filtering application 30.

The communication component 46 may be a wireless or wired communication component that may facilitate communication between the computing device 12, and various other computing systems via the network 22, the Internet, or the like. The display 48 may depict visualizations associated with software or executable code being processed by the processor 42. The display 48 may be any suitable type of display, such as a liquid crystal display (LCD), plasma display, or an organic light emitting diode (OLED) display, a projected display, and the like. Additionally, in one embodiment, the display 48 may be provided in conjunction with a touch-sensitive mechanism or touch display (e.g., a touch screen) that may function as part of a control interface for the computing device 12 and be capable of receiving inputs from a user (e.g., the property owner). The I/O ports 50 may be interfaces that may couple to other peripheral components such as input devices (e.g., keyboard, mouse), the input/output (I/O) devices 50, and the like. For example, to provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Figure 3:
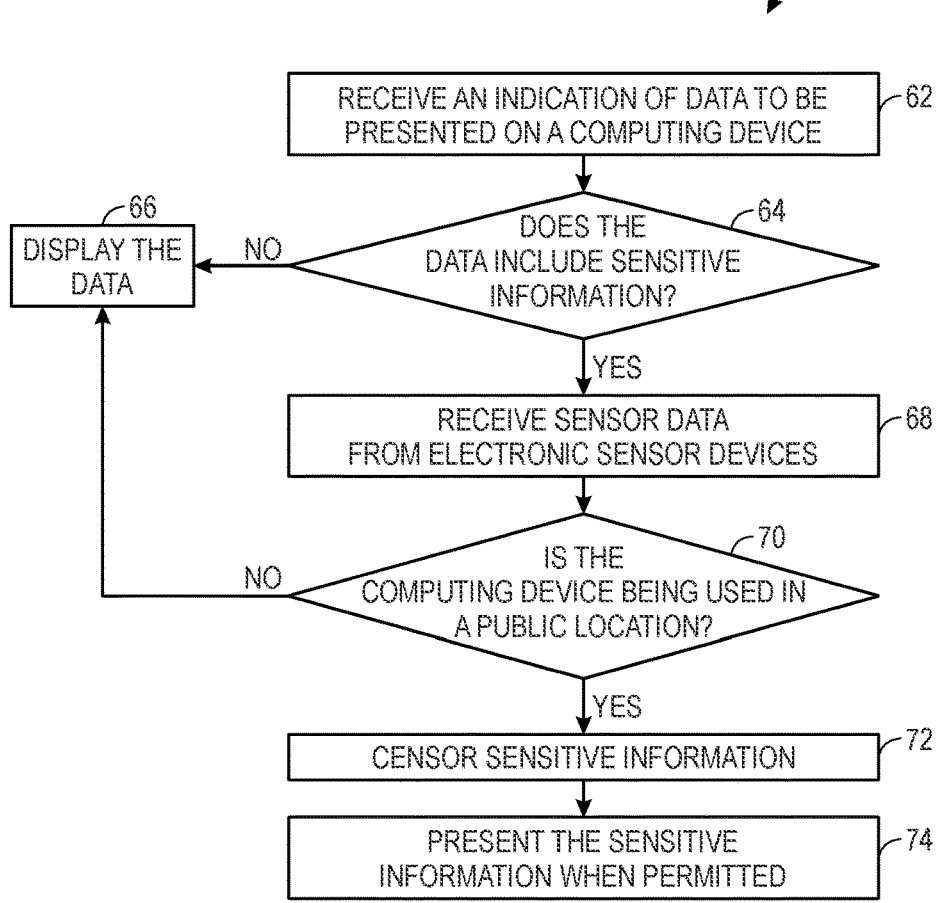
FIG. 3 is a flow diagram for censoring user data that includes sensitive information when a user is a public location, in accordance with embodiments described herein.

FIG. 3 illustrates an example process 60 that may be employed by the censoring application 30 to censor sensitive information to be presented on a computing device 12, in accordance with embodiments described herein. The steps of the process 60 may be stored in the memory and/or the storage 44. Before proceeding, it should be noted that the process 60 is described as being performed by the processor 42 of the computing device 12 (e.g., executing the private content censoring application 30 stored in the memory and/or the storage 44), but the process 60 may be performed by other suitable computing devices. Although described in a particular order, which represents a particular embodiment, it should be noted that the process 60 may be performed in any suitable order. Additionally, embodiments of the process 60 may omit process blocks and/or include additional process blocks.

Referring now to FIG. 3, at block 62, the processor 42 may receive an indication indicative of data (e.g., image data, audio data, video data) to be presented on a computing device 12. The indication may be sent by the computer device 12 or any other suitable computing device, such as the external device 14, in response to detecting that a request for data has been received. In some embodiments, the processor 42 may receive the indication in response to the user accessing a software application using the computing device 12. For example, the processor 42 may receive the indication in response to the user opening an email using the computing device 12 (e.g., accessing a software application), the user requesting that an email be read via the external device 14, or the like. At least in some instances, the processor 42 may determine whether the application being access is on a list of applications that may present sensitive information. For example, the list may include email applications, cloud drive applications, word processing applications, and other software applications that may be utilized to access or manage sensitive information. As such, if the processor 42 may determine that the software application being accessed is on the list of applications, the process 60 may proceed to block 64. As another non-limiting example, the processor 42 may receive the indication in response to the processor 42 opening a file of a certain type, such as video data, image data, text, and/or audio data. As such, the processor 42 may proceed to block 64 when the data includes video data, image capture data, text, and/or audio data. In some embodiments, the censoring application 30 may cause the processor 42 to default to censoring such data. In additional or alternative embodiments, the processor 42 may output a control signal that causes a pop-up or notification to be displayed on a computing device 12 that notifies the user that image content or audio content that may include sensitive content may be presented.

In some embodiments, the processor 42 may retrieve, intercept, or collect the data to be presented on the computing device 12 in response to receiving the indication of the data to be presented on the computing device 12. In general, retrieving, intercepting, or collecting the data to be presented on the computing device 12 may include accessing the data before the data is presented or opened and proceeding to block 64 to perform operations on the data as discussed in detail below. In this way, the processor 42 may prevent data including sensitive information from being displayed in a public area, or otherwise a location where the user may not desire the data be presented.

At block 64, the processor 42 may determine one or more characteristics of the image data, audio data, text data, and/or video data. In general, the one or more characteristics of image data, audio data, text data, and/or video data may include indicia that assists the processor 42 determine whether the data may be sensitive. If the data is determined to include sensitive information, the user may not want the content displayed on the computing device 12. For example, the processor 42 may determine a size of the data, a type of the data, a company associated with an email or website that provided the content, whether any metadata associated with fields of a form indicate that the fields include sensitive information (e.g., as pre-defined in a database), and the like. In some embodiments, the processor 42 may user optical character recognition, pattern matching, and other suitable technology to determine whether any strings or images within an email includes sensitive information.

Continuing with the example of using optical character recognition, the processor 42 may determine that the data includes sensitive information after a threshold number of digits in the image data that match the number of digits of a reference number classified as sensitive information (e.g., the OCR indicates that a number of digits of a portion of the image data matches the reference sensitive information greater than 50%, 60%, 70%, 80%, 90%, and 100%). If the match is above the threshold, the processor 42 may output a control signal that causes a pop-up or notification to be displayed on a display of the computing device 12. The pop-up or notification may inform the user of that the email contains sensitive information and depict one or more buttons for the user to select to indicate whether or not to display the email (e.g., proceed to block 66).

With respect to the example of using pattern matching, the processor 42 may determine whether any string of data in the image data, video data, text, and/or audio data matches a predefined pattern corresponding to data classified as sensitive information, such as a social security number, driver license number, vehicle identification number (VIN), insurance policy number, military identifier, phone number, a credit card number, an expiration date of a credit card number, a bank account number, a tracking number, and the like. At least in some instances, the predefined pattern may be provided by the user during an initial setup of the censoring application 30. In another embodiment, the processor 42 may use a machine-learning algorithm that monitors the behavior of a number of individuals with regard to the classification of sensitive information. That is, for example, after a threshold number of individuals classify a particular data type as sensitive information, the processor 42 may add the data type as a predefined pattern or data type to be considered as sensitive information.

In any case, the processor 42 may determine whether the data matches the predefined pattern within a threshold amount of degree that may correspond to a confidence level (e.g., 50%, 60%, 70%, 80%, 90%, and 100%). For example, if the data is a photocopy of a document, at least a portion of the sensitive information may be partially obscured due to unintentional features (e.g., improper positioning of the document during photocopying, a spill, ink bleeding). As such, it may be advantageous to use a threshold below 100%). If the match is above the threshold, the processor 42 may output a control signal that causes a pop-up or notification to be displayed on a display of the computing device 12. The pop-up or notification may inform the user of that the email contains sensitive information and depict one or more buttons for the user to select to indicate whether to display the email (e.g., proceed to block 68) or whether to sensor the data identified as being sensitive. If the processor 42 determines that the data does not include sensitive information or the user selects a button that indicates that the user desires to present the data, the processor 42 may proceed to block 66 and display the data (e.g., without censoring the sensitive information).

If, however, the processor 42 determines that the data includes sensitive information at block 64, the processor 42 may proceed to block 68. At block 68, the processor 42 may receive, collect, or monitor sensor data from the electronic sensor devices 18 associated with the computing device 12 to assess whether unwanted or any other individual or electronic device may be in the presence of the information being presented by the processor 42. In some embodiments, to receive the data from the electronic sensor devices 18, the processor 42 may output a control signal that causes one or more electronic sensor devices 18 associated with the computing device 12 to acquire sensor data. For example, the processor 42 may output a control signal to a camera (e.g., the image capture device 32) that is connected to the computing device 12 (e.g., via an I/O port 50), causing the camera to acquire sensor image data and/or sensor video data. As another non-limiting example, the processor 42 may output a control signal to a temperature sensor that may indicate a temperature value in the room over time, which may be used to determine whether a number of users within a room or near the computing device 12 has increased (e.g., increased temperature corresponds to increased occupancy). In some embodiments, the processor 42 may receive the sensor data from the electronic sensor devices 18 while the image data, video data, and audio data are presented or prior to the presentation of the data. In any case, after receiving the sensor data, the processor 42 may periodically proceed to block 70 and determine whether the computing device 12 is being used in a public location (or a location deemed inappropriate). In this way, the censoring application 30 may censor the sensitive information when an unauthorized user, that was previously not in a position to view or hear the sensitive information, moves to such a position, or the user moves to a position that enables an unauthorized person or sensor (camera, mic, etc.) to view and or hear the data.

Referring again to block 70, the processor 42 may determine whether the user (e.g., an authorized user) is using the computing device 12 in a public location or in an area in which unknown or unwanted individuals or devices may have access to view or acquire the sensitive information based on the sensor image data received from the electronic sensor devices 18. As will be described in more detail with respect to FIG. 4, the processor 42 may use pattern matching, facial identification, object-based image analysis, and the like, to determine whether features within the sensor image data and/or sensor video data are indicative of a third party having the ability to acquire (e.g., view, listen) information presented using the computing device 12. For example, the processor 42 may identify a camera or other recording device (e.g., smart phone) in sensor image data and a person proximate to the camera, which may indicate that the person is taking a photograph that may include the sensitive information.

In some embodiments, the processor 42 may monitor other sensor data (e.g., temperature, humidity) and/or network data. For example, the temperature and/or humidity may indicate a location that the user is utilizing the computing device 12. As such, if the user is working in an area with relatively warm temperature as compare to his/her expected environment, which may have relatively cooler temperatures, the processor 42 may determine that the user is in a public location. That is, the processor 42 may compare a monitored temperature (e.g., measured over a predetermined amount of time such as every minute for 5 minutes) to a reference temperature indicative of a number of occupants in a room. For example, the reference temperature may be a previously measured value corresponding to a temperature of a room when a particular number of occupants are in the room (e.g., only the user, or including one or more people who may typically work nearby the user). As such, if the processor 42 determines that the monitored temperature exceeds the reference temperature, the processor 42 may determine that the user is working in a public location. Alternatively, if the processor 42 determines that the monitored temperature is lower than the reference temperature, this may be indicative of the user being away from their computer or the user working in a private location. Accordingly, the processor 42 may automatically determine that the user is working in a private location when the monitored temperature is below the reference temperature, display a notification to the user to request for user input to indicate whether they are working in public, and/or monitor other data to further confirm whether the user is working in his/her expected environment. As another non-limiting example, the processor 42 may use weather data to determine whether the user is working outside of his/her expected environment (e.g., in a public location). For example, the processor 42 may identify a location (e.g., a city, a street address, GPS coordinates) associated with where the user is currently working. Then, the processor 42 may determine the current weather conditions (e.g., humidity, temperature, rain, air pressure, partly cloudy, thunderstorms), based on a combination of the other sensors 36 (e.g., to measure the temperature), image capture sensors 32 (e.g., to determine whether there is rain), and audio sensors 38 (e.g., to determine whether there is rain or thunderstorms). As such, the processor 42 may identify a weather condition based on the temperature, the sensor image data, and/or the sensor audio data, and compare the weather condition to a reference weather condition, which may be accessed using a network connection to a weather website via the network 22.

In some embodiments, the processor 42 may coordinate with other smart electronic sensor devices 18 that may be present in the area, such as home automation devices, smart appliances, and the like. The collected sensor data of smart home devices and the user's device may be used to verify the location of the user. For example, the processor 42 may identify devices connected to the network 22 that the computing device 12 is accessing. The processor 42 may then compare the identified devices that are accessible to the network 22 to a reference list of devices expected to be present on the network 22 to determine whether the identified devices matches the reference list within a threshold (e.g., 10%, 50%, 60%, 70%, 80%, 90%, 100%). At least in some instances, the processor 42 may utilize machine learning algorithms to generate correlations between locations that the user may work, such as public locations and locations that may be private locations (e.g., a home office, an office at work). For example, the processor 42 may correlate a first subset of device network data associated with a first subset of devices, such as a MAC address for each of the first subset of devices, with a home. Additionally, the processor 42 may correlate a second subset of device network data associated with a second subset of devices, such as a MAC address for each of the second subset of devices, with a public location, such as a coffee shop. As such, the processor 42 may determine that the computing device 12 is connected to a network associated with the coffee shop when the network data indicates that the second subset of devices are accessible. Similarly, the processor 42 may determine that the computing device 12 is connected to a network associated with the user's home when the network data indicates that the first subset of devices are accessible.

While the examples above relate to the processor 42 determining whether the user is using the computing device 12 in a public location, it should be noted that the processor 42 may also determine whether an authorized user is using the computing device 12. As such, the computing device 12 may censor sensitive information displayed on the display 48 of the computing device 15 (e.g., sensitive information currently displayed, sensitive information of files that are subsequently opened), and the like in response to determining that the user of the computing device 12 is unauthorized.

For example, in some embodiments, the processor 42 may monitor user device usage patterns (e.g., patterns associated with usage of external devices 14 and devices connected to or integrated with the computing device 12) to determine whether the user authorized to use the computing device 12 is indeed using the computing device 12. That is, the processor 42 may correlate device usage patterns, such as clicking frequencies, mouse movements, typing patterns, vocabulary of typed data, key strokes, application usage, web browser preferences, and the like to an authorized user. Further, the processor 42 may store these correlations in the memory and storage 44 and use the correlations to determine whether the user or an unauthorized user is using the computing device 12. For example, the processor 42 may identify that a user currently using the computing device 12 uses shortcuts to close out applications (e.g., alt+F4). A stored correlation the authorized user may indicate that the user typically closes out applications using clicks, instead of via the use of a shortcut (e.g., alt+F4). As such, the processor 42 may determine that an authorized user is not using the computing device 12 based on the use of shortcuts, and thus the processor 42 may proceed to block 72 and censor any sensitive information.

Referring back to block 70, if the processor 42 does not determine that the user is using the computing device in a public or other undesirable location, the processor 42 may display the sensitive information (e.g., block 66). If, however, the processor 42 does determine that the user is using the computing device in a public or undesirable location, the processor 42 may proceed to block 72. At block 72, the processor 42 may censor the sensitive information to generate censored sensitive information. As discussed herein, censoring image data and/or video data includes randomizing a portion of image data and/or video data that includes sensitive information, masking a portion of an image data and/or video data that includes sensitive information using an object (e.g., a shape, a character) that is displayed over the sensitive information, replacing the portion of the image data that includes the sensitive information using an object such that the sensitive information is less visible (e.g., masking the sensitive information with an object have 50% opacity) or not visible to viewers or viewing devices, and various other methods for making the sensitive data difficult to view or acquire (including devices that can collect electronic noise and/or spurious signals to determine what is being typed or displayed). In some embodiments, censoring audio data includes altering a volume of the portion of the audio data that includes the sensitive information, masking the portion of audio data with another sound, removing the portion of the audio data that includes the sensitive information such that the sensitive information may not be heard, playing the audio data using another device, or the like. In some embodiments, the processor 42 may generate false or pseudo data and present the false or pseudo data instead of the sensitive information or mask the sensitive information with the false or pseudo data.

By employing the process 60 described above, the processor 42 may censor the sensitive information in response to identifying the data is being presented on the computing device 12 and determining that the user is in a public location. For example, the processor 42 may censor the information that is being displayed on the computing device 12 in response to determining that an unauthorized user has appeared in video data and/or sensor image data while the sensitive data is being displayed or prior to the sensitive data being displayed.

At block 74, the processor 42 may uncensor or present the sensitive information in response to determining that the sensitive information is permitted to be presented. In some embodiments, the processor 42 may present the sensitive information based on an input provided by a user that the sensitive information may be presented. For example, the processor 42 may receive an input based on the user pressing a selectable button on a GUI, hovering the a cursor over a region where the sensitive information is masked, or any other user input requesting that the censored data be made viewable. In some embodiments, the processor 42 may receive the request in response to the processor 42 determining that the user is no longer in a public location or determining that authorized users are no longer present in audio data and/or sensor image data acquired by the electronic sensor devices. In addition, the processor 42 may uncensor or transmit the sensitive information to a suitable device (e.g., audio headphone, wearable device) to enable the user to view or acquire the data without compromising the security of the data being presented. In some embodiments, the processor 42 may automatically transmit the sensitive data to the alternative device after determining the user is using the computing device 12 in a public location based on data received from the electronic censor devices (e.g., block 68).

By way of example, the processor 42 may transmit the sensitive information, or a portion of the sensitive information to an external device 14 of the user. In general, the user may view the sensitive information on the external device 14 in a manner that is less likely to be view by unauthorized users. For example, the sensitive information may be transmitted to a smart watch of the user. As such, the user may view the smart watch when the user wants to see the sensitive information. In this way, the privacy of the sensitive information may be improved and, in the event an unauthorized user views the sensitive information displaying on the external device, the unauthorized user may not have the context of the sensitive information, thereby preventing the unauthorized user from using the sensitive information. Accordingly, the process 60 may enable the computing device 12 to selectively censor and display sensitive information based on data received by an electronic sensor device 18.

Figure 4:
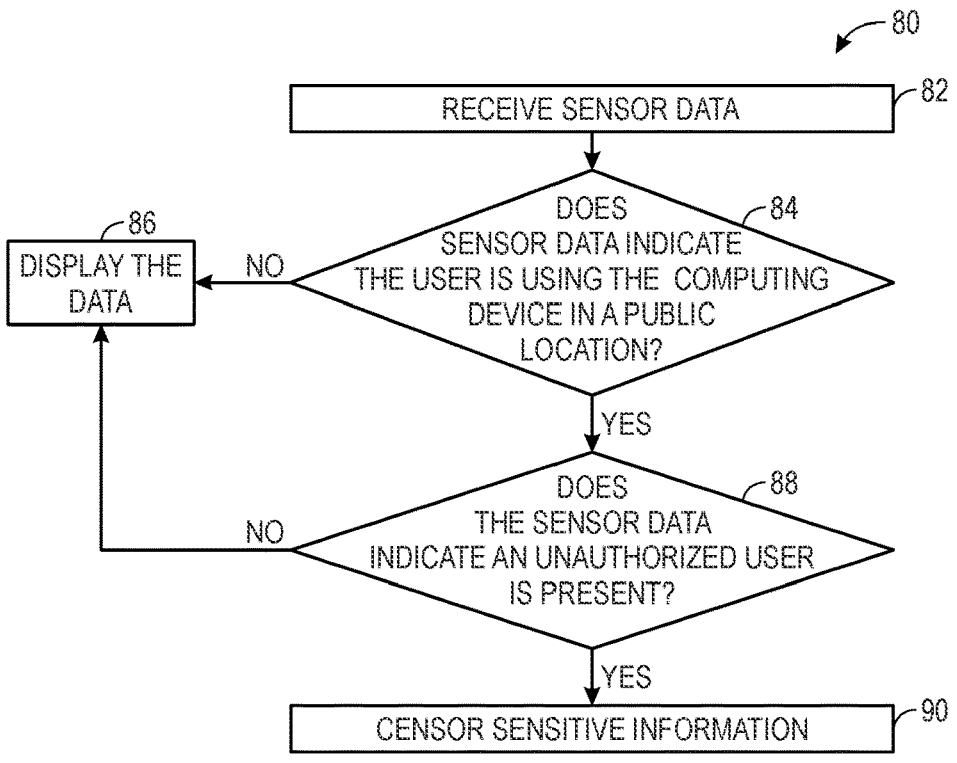
FIG. 4 is a flow diagram for selectively censoring sensitive information based on received image data from an image capture/creation device, in accordance with embodiments described herein.

To further illustrate blocks 68 and 70 of the process 60 of FIG. 3, FIGS. 4-6 illustrate example processes that may be employed by the censoring application 30 to determine whether the user is using the device in a public location based on data collected by electronic sensor device 18. For example, FIG. 4 illustrates an example process 80 that may be employed by the censoring application 30 to selectively censor information to be displayed on the computing device 12 based on sensor image data acquired by the computing device 12. For example, the steps of the process 80 may be stored in the memory and/or storage 44. Before proceeding, it should be noted that the process 80 described below is described as being performed by the processor 42 of the computing device 12 (e.g., executing the censoring application 30 stored in the memory and/or the storage 44), but the process 80 may be performed by other suitable computing devices. Although described in a particular order, which represents a particular embodiment, it should be noted that the process 80 may be performed in any suitable order. Additionally, embodiments of the process 80 may omit process blocks and/or include additional process blocks.

Referring now to FIG. 4, at block 82, the processor 42 may receive the data acquired by the electronic sensor device 18. In some embodiments, the processor 42 may send suitable signals (e.g., control signals) to instruct the electronic sensor devices 18 to acquire data (e.g., audio data, video data, sensor image data, and the like) based on an expected time of the scheduled service. For example, the processor 42 may instruct the electronic sensor devices 18 to acquire data continuously and/or within a time window around a scheduled time (e.g., 5 minutes, 10 minutes, 30 minutes, 1 hour, etc.), such as while the user is accessing certain application or data that may include sensitive data. In some embodiments, an imaging device (e.g., a camera, microphone, video recorder, and the like) may record an image and/or a video of an area around the user. Additionally, in some embodiments, a time stamp may be included with any of the data mentioned above.

At block 84, the processor 42 may determine whether the sensor image data indicates that the user is using the computing device 12 in a public location. In some embodiments, the processor 42 may determine whether the sensor image data is associated with a public location based on a comparison of the sensor image data obtained by the electronic sensor device 18 and a reference image data (e.g., stored in the memory and/or storage 44), such as by using object recognition techniques or object-based image analysis. For example, the processor 42 may identify objects (e.g., lamps, computers, coffee mugs, framed objects, lighting) that may indicate whether the user is using the computing device 12 in an office or in a public location. As such, when the processor 42 identifies objects that are not associated with the user's office or an expected environment, the processor 42 may determine that the user is working in a public location and the processor 42 may censor the sensitive information. However, if the processor 42 determines that the sensor image data does not indicate that the user is using the device in a public location or is located in an expected environment (e.g., home office), the processor may display the sensitive information (e.g., at block 86).

In some instances, the processor 42 may determine whether the sensor image data matches the reference image data based on a threshold. For example, the processor 42 may use certain image recognition techniques, such as optical character recognition, pattern matching and gradient matching, face recognition, and the like. Continuing with the example mentioned above, the threshold may correspond to a number of points or objects present in the sensor image data that match the points or object present in the reference image data (e.g., 100% of the points matching, greater than 90% of the points matching, greater than 80% of the points matching, greater than 50% of the points matching). If the match is below the threshold, the processor 42 may proceed to block 88. Alternatively, if the sensor data does not indicate that the user is using the computing device 12 in a public location, the processor 42 may proceed to block 86 and display the requested data.

At block 88, the processor 42 may determine whether the sensor image data indicates that unauthorized users are present in the sensor image data. In some embodiments, block 88 may be performed in response to determining that there are additional users present in the sensor image data. In some embodiments, the processor 42 may determine whether the sensor image data is associated with the user based on a comparison of sensor image data obtained by the electronic sensor device 18 and a reference image data (e.g., stored in the memory and/or storage 44), such as by using facial recognition techniques. For example, the processor 42 may identify one or more biometric points of an image of an identified face. Then, the processor 42 may compare a number of identified biometric points in the sensor image data to a number biometric points in the reference image data to determine whether the image includes the user of the computing device 12 or other authorized people (e.g., a babysitter, family members, friends, a service person). As such, when the processor 42 determines that the sensor image data includes an image of an authorized user, the processor 42 may determine that the received sensor image data is associated with the user and proceed to block 86.

In some embodiments, the processor 42 may also determine that unauthorized persons are present or near the computing device 12 based on detected features (e.g., facial expressions, biometric measurements such as heart rate, breathing patterns, eye movement) of the user that may indicate that the user is working under duress. That is, an unauthorized user that is not presently visible by the image capture device 32 may be coercing the user to access the sensitive information. For example, the processor 42 may determine that the user is looking off screen based on image data, blood pressure is unusual, unusual eye movement or lack of eye movement, crying, squinting, unusual blinking patterns, unusual tics or twitches breathing rapidly based on image data and/or biometric data, and thus, determine that the user is working under duress. As such, the processor 42 may determine that the sensor data indicates that unauthorized users are present or influencing the user even though the unauthorized users have not been detected via the sensor image data.

After determining that unauthorized users are present, the processor 42 may proceed to block 90 and censor the sensitive information at block 90, which is described above in block 72 of FIG. 3. In some instances, the processor 42 may output an alert or signal indicative of a message to devices within a proximity requesting that the detected individuals move away from the computing device 12. The processor may proceed to create false indicators of lost connectivity, software errors, or other reasons for malfunction commonly accepted as being beyond the control of the user, in order to stop sharing the data without creating suspicion of unauthorized users, and without impugning authorized users thereby putting them at risk of harm from unauthorized users.

Figure 5:
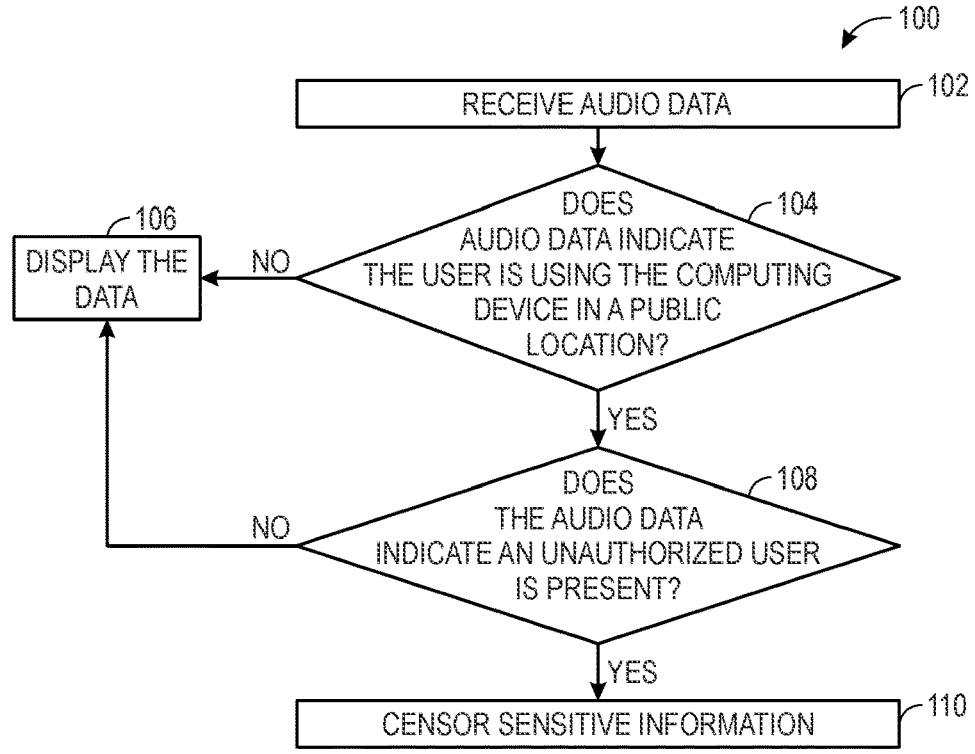
FIG. 5 is a flow diagram for selectively censoring sensitive information based on received sensor audio data obtained by an audio sensor, in accordance with embodiments described herein.

As another non-limiting example of sensor data that may be used to determine whether to censor sensitive information, FIG. 5 illustrates an example process 100 that may be employed by the censoring application 30 to selectively censor information to be displayed on the computing device 12 based on sensor audio data acquired by the computing device 12. For example, the steps of the process 100 may be stored in the memory and/or storage 44. Before proceeding, it should be noted that the process 100 described below is described as being performed by the processor 42 of the computing device 12 (e.g., executing the censoring application 30 stored in the memory and/or the storage 44), but the process 100 may be performed by other suitable computing devices. Although described in a particular order, which represents a particular embodiment, it should be noted that the process 100 may be performed in any suitable order. Additionally, embodiments of the process 100 may omit process blocks and/or include additional process blocks.

At block 102, the processor 42 may receive the audio data acquired by the electronic sensor device 18. In some embodiments, the processor 42 may send suitable signals (e.g., control signals) to instruct the audio sensors 38 to acquire audio data based on the operation of the computing device 12. For example, the processor 42 may receive the audio data related to an environment surrounding the computing device 12 while the user is utilizing a software application associated with the user's work or the presence of sensitive information.

At block 104, the processor 42 may determine whether the received audio data indicates whether the user is using the computing device 12 in a public location. In general, the processor 42 may detect for ambient noise (e.g., for an order pick up), music being played, and other audible indications that the user device is using the computing device 12 in a public location. In some embodiments, the processor 42 may compare the received audio data to reference audio data (e.g., previously captured audio data of an authorized or identified person or persons) to determine whether the audio data is associated with the user or other authorized inhabitants. For example, the processor 42 may compare sound characteristics (e.g., music profiles, ambient noise profiles, expected language, expected vocabulary, expected sounds) of the received audio data to sound characteristics corresponding to reference audio data, which may be provided by the user during or after setup or initial monitoring performed by the censoring application 30. When the sound characteristics of the audio data correlate to or match the sound characteristics of the reference audio data corresponding to the user or other authorized individuals, the processor 42 may determine that the received audio data does not indicate that the user is using the computing device 12 in a public location and the process 100 proceeds to block 106 and displays the data. However, if the processor 42 determines that the received audio data does not indicate that the user is using the computing device 12 in the public location, the process 100 may proceed to block 106 and display the data.

At block 108, the processor 42 may determine whether the audio data indicates whether unauthorized users are present. In general, the processor 42 may perform block 108 of process 100 in response to determining that the user is using the computing device 12 in a public location or around other people. For example, the processor 42 may compare sound characteristics (e.g., voice profiles) of the audio data to sound characteristics corresponding to reference audio data of the user, which may be provided by the user during or after setup or initial monitoring performed by the censoring application 30. When the sound characteristics of the audio data correlate to or match the sound characteristics of the reference audio data corresponding to the user or other authorized individuals, the processor 42 may determine that the received data is associated with the user and the process 100 proceeds to block 106 and displays the data. At block 110, the processor 42 censors the data, which is generally similar to the process described in block 72 of FIG. 3.

Figures 6, 7, 8:
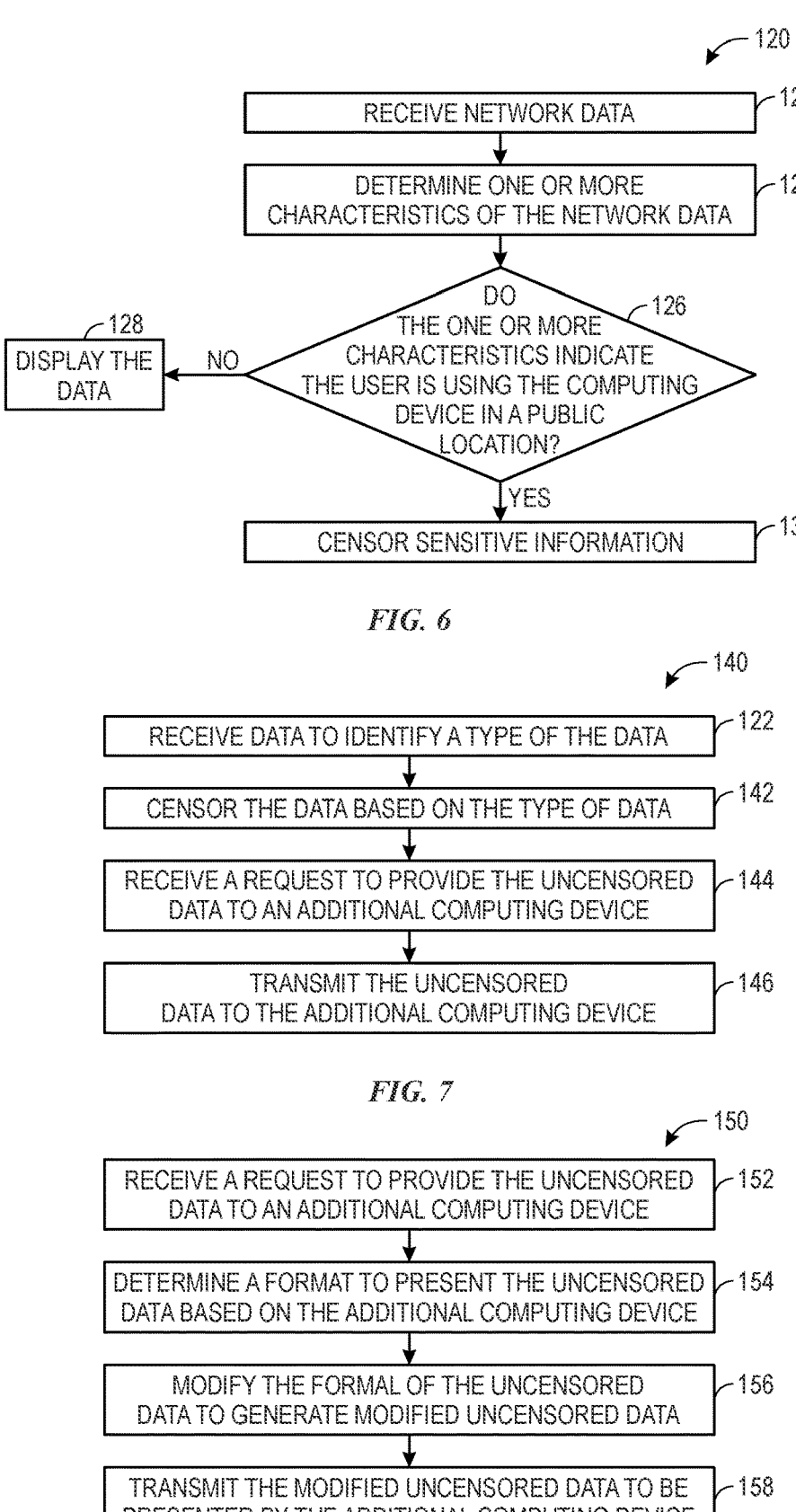
FIG. 6 is a flow diagram for selectively censoring sensitive information based on received network data obtained by a network device, in accordance with embodiments described herein.
FIG. 7 is a flow diagram for transmitting uncensored data to an additional computing device, in accordance with embodiments described herein.
FIG. 8 is a flow diagram for transmitting modified uncensored data to an additional computing device based on a format to display the uncensored data, in accordance with embodiments described herein.

For example, FIG. 6 illustrates an example process 120 that may be employed by the censoring application 30 to selectively censor information to be displayed on the computing device 12 based on network data acquired by the computing device 12. For example, the steps of the process 120 may be stored in the memory and/or storage 44. Before proceeding, it should be noted that the process 120 described below is described as being performed by the processor 42 of the computing device 12 (e.g., executing the censoring application 30 stored in the memory and/or the storage 44), but the process 120 may be performed by other suitable computing devices. Although described in a particular order, which represents a particular embodiment, it should be noted that the process 120 may be performed in any suitable order. Additionally, embodiments of the process 120 may omit process blocks and/or include additional process blocks.

At block 122, the processor 42 may receive the network data acquired by the electronic sensor device 18. In some embodiments, the processor 42 may send suitable signals (e.g., control signals) to receive network data from the network devices in response to the computing device 12 connecting to a network. In some embodiments, the processor 42 may instruct the electronic sensor devices 18 to acquire data continuously and/or within a time window around a scheduled service time (e.g., 5 minutes, 10 minutes, 30 minutes, 1 hour, etc.)

At block 124, the processor 42 may determine one or more characteristics of the network data. In general, the one or more characteristics may indicate whether the user is using the computing device 12 within a private area (e.g., the user's office). The one or more characteristics of the network data may include an IP address, a network name, a connection strength, a ping, transmission duration, and other characteristics that indicate an identity, location, and quality of connection between the network and the computing device 12.

At block 126, the processor 42 may determine whether the user is using the computing device 12 in a public location based on the one or more characteristics of the network data mentioned above. In general, the processor 42 may determine whether the one or more characteristics of the network data differ from one or more reference characteristics of network data that may indicate the user is working from the privacy of the user's office. For example, in an embodiment where the one or more characteristics of the network data include a network name, such as a Wi-Fi connection name, the processor 42 may determine that the user is using the computing device 12 in a public location when the Wi-Fi connection name differs from a name associated with the user's office or another expected network name. In general, the storage 44 may store a list of reference network names (e.g., associated with the user's private office, associated with the user's office at work) that the processor may use to determine whether a current Wi-Fi connection name indicates the user is working in a public location. Similarly, the storage 44 may also store a list of reference network names that are associated with public locations (e.g., a Wi-Fi at a friend's house, a Wi-Fi at a coffee shop, a Wi-Fi used on airplanes). As such, when the one or more characteristics indicate that the computing device 12 is connected to the Wi-Fi at a coffee shop, the processor 42 may determine that the user is using the computing device 12 in a public location.

As another non-limiting example, the one or more characteristics of the network data may include a signal strength. The signal strength may indicate a proximity of the computing device 12 to the network 22. As such, the processor 42 may compare the signal strength to a threshold signal strength. When the signal strength is below the threshold signal strength, the processor 42 may determine that the user is using the computing device 12 in a public location. For example, although the user may be connected to a private Wi-Fi or expected network, the computing device 12 may be located in a different room or area of a building (e.g., a rooftop) and thus outside of a private environment.

In any case, if the one or more characteristics of the network data do not indicate that the user is using the computing device 12 in a public location, the processor 42 may display image data, video data, or audio data using the computing device 12 (e.g., at block 128.)

At block 130, the processor 42 censors the data captured by the electronic sensor device 18 in a similar manner as discussed above with respect to block 72 of FIG. 3. In any case, if the processor 42 determines that the network data indicates that unauthorized users are present or the user selects a button that indicates the user desires to present the data, then the data is displayed, at block 128 (e.g., without censoring the sensitive information).

Censoring data presented via the computing device 12 may be based on a list of data classified as being sensitive. In addition, the processor 42 may dynamically evaluate data presented by the computing device 12 or to be presented via the computing device 12 while performing the processes described above. For instance, FIG. 7 illustrates an example process 140 that may be employed by the censoring application 30 to selectively censor information to be displayed on the computing device 12 based on a format type of the sensitive information. For example, the steps of the process 140 may be stored in the memory and/or storage 44. Before proceeding, it should be noted that the process 140 described below is described as being performed by the processor 42 of the computing device 12 (e.g., executing the censoring application 30 stored in the memory and/or the storage 44), but the process 140 may be performed by other suitable computing devices. Although described in a particular order, which represents a particular embodiment, it should be noted that the process 140 may be performed in any suitable order. Additionally, embodiments of the process 140 may omit process blocks and/or include additional process blocks.

At block 142, the processor 42 may review the data to be presented or being presented to identify different types of data that are present. That is, for documents, the processor 42 may scan the document to identify a collection of number, alphanumeric phrases, or other input fields (e.g., blank space, underlined data) that may correspond to sensitive data. In some embodiments, the processor 42 may categorize the input fields as sensitive information that may be censored.

In addition to input fields, the processor may review the presented data to determine format types of data being presented. For example, the processor 42 may determine that an email attachment includes spreadsheet data, word processor data, presentation data, audio data, video data, and/or image data. As such, the format type would be the audio data, the video data, or the image data. In some embodiments, certain format types may be categorized as having sensitive information. In addition, certain format types may be designated as having sensitive information regardless of the data stored therein because the format type can be presented via an alternate channel, as opposed to the computing device 12. In this way, the user may view data via different channels to make it more difficult for any data to be acquire or misappropriated by another individual.

At block 144, the processor 42 may censor the identified information of block 142. That is, the identified data may be censored using any of the methods described above. For example, when the format type is image data, the processor 42 may generate an object to mask the sensitive information. Further, the processor 42 may configure the censored data to become selectively removed (e.g., uncensored) upon the user providing a password, hovering a cursor over the object masking the sensitive information, receiving a voice command, or otherwise indicate (e.g., using the input device 50) that the user desires to see the sensitive information. As another non-limiting example, when the format type is audio data, the processor 42 may generate an additional audio layer in the audio data such that the additional audio layer may mask the sensitive information when the audio data is output by an audio device. Further, the processor 42 may configure the additional audio layer to be selectively removed upon the user indicating that the user desires to see the sensitive information using an input device 50. In some embodiments, the type of censoring (e.g., masking, removing, partial masking) may be provided as an input by the user, such as during setup of the censoring application 30.

At block 146, the processor 42 may receive a request to provide the uncensored data to another computing device. In some embodiments, the request may be received based on a user selection from another computing device to receive and present the uncensored data. For example, the processor 42 may scan for devices (e.g., the external device 14, the wearable device 16, and the smart glasses 20) connected (e.g., physically or wirelessly) to the computing device 12. Additionally or alternatively, the processor 42 may scan for devices currently paired with (e.g., via a wireless connection) the computing device 12 or capable of pairing with the computing device 12. In any case, the processor 42 may output a control signal that causes the display 48 to present a list of paired or connected devices identified using the scan. Then, the processor 42 may receive a selection (e.g., via the input device 50) of one of the devices presented in the list. In additional or alternative embodiments, the request may be received from a computing device paired with or connected to the computing device 12. For example, an external device 14 may execute an application capable of communicating the request to computing device 12. As such, when the processor 42 receives the request from the external device 14, the process 140 may proceed to block 148. Additionally, the processor 42 may display a user selectable control (e.g., a button) enabling a user to confirm whether to transmit or not transmit the censored data to the external device 14. If the processor 42 is unable to identify an additional computing device, the processor 42 may provide an indication to the user that no additional devices are paired with or connected to the computing device 12. In some embodiments, the indication may list one or more devices that are capable of connecting to or pairing with the computing device 12. Accordingly, the indication may also include a user selectable control enabling the user to confirm whether to pair with one of the listed devices.

In some embodiments, the processor 42 may receive the request based on other types of input that are provided by the user. For example, the user may select a button, input a password, or take another action using the input devices that indicates that user wishes to see the sensitive information, such as on an external device that is paired with the computing device 12.

Referring to block 148, the processor 42 may transmit the uncensored data (e.g., the sensitive information) to be presented by the additional device. For example, the processor 42 may transmit an image, a text message, audio data, and other suitable formats of the data to be presented on the external device 14. In some embodiments, the uncensored data may be presented by the external device 14 for a time period. For example, the processor 42 may output a message that is displayed on the external device 14 for a predetermined time period, and when the predetermined time period has elapsed, the uncensored data may not be displayed on the external device 14 until the uncensored data is transmitted again to the external device 14. In some embodiments, the processor 42 may transmit the censored data to the external device 14 and enable the external device 14 to uncensor the censored data in response to receiving an indication that the user desires to view the uncensored data.

As discussed above, the censoring application 30 may transmit the uncensored data (e.g., the sensitive information)

to the external devices 14 and the wearable devices 16. To further illustrate this, FIG. 8 illustrates an example process 150 that may be employed by the censoring application 30 to transmit the sensitive information to external devices 14 for displaying the at least a portion of the sensitive information by the external devices. For example, the steps of the process 150 may be stored in the memory and/or storage 44. Before proceeding, it should be noted that the process 150 described below is described as being performed by the processor 42 of the computing device 12 (e.g., executing the private content censoring application 30 stored in the memory and/or the storage 44), but the process 150 may be performed by other suitable computing devices. Although described in a particular order, which represents a particular embodiment, it should be noted that the process 150 may be performed in any suitable order. Additionally, embodiments of the process 150 may omit process blocks and/or include additional process blocks.

At block 152, the processor 42 may receive a request to transmit the uncensored data to an external device 14, which is generally similar to the process described in block 148 of FIG. 7. At block 154, the processor 42 may determine a format to present the uncensored information based on the external devices 14. In general, the processor 42 may determine a format (e.g., a data size, a data type) that the external device may present. That is, the processor 42 may determine that a first format associated with the censored data displayed on the computing device 12 is different than a second format that the external device 14 may present. In some embodiments, the processor 42 may cause the display to display user-selectable controls (e.g., one or more buttons) enabling a user to provide an input of a format for presenting the uncensored data using the external device 14. For example, the user may provide an input indicating that the user wishes to view the uncensored data as a text message or an image or listen to the uncensored data in an audio format. In some embodiments, the request may be an indication wishes to present a portion of the uncensored data using the external device 14.

At block 156, the processor 42 may modify the format of the uncensored data in response to determining the format to present the uncensored data. For example, the computing device 12 may display the censored data in a first format, such image data, and the processor 42 may determine that the uncensored data is to be presented using the external device 14 in a second format, such as a text data. As such, the processor 42 may utilize OCR techniques to generate a modified uncensored data that is text data. As another non-limiting example, the processor 42 may determine that a color filter or an encryption filter is to be displayed using the smart glasses 20. As discussed above, the smart glasses 20 (e.g., displaying the color filter or the encryption filter) when worn by the user and the user is viewing masked sensitive content, may enable the user to view the sensitive information, which may be otherwise invisible to other users.

At block 156, the processor 42 may transmit the modified uncensored information to the external device 14 to be presented by the external device. For example, the external device 14 may be a mobile phone. As such, the processor 42 may cause a text message, an email, or an image to be sent to the mobile phone such that the user may view the uncensored information at the discretion of the user and further out of view of any unauthorized users. As another non-limiting example, when the external device 14 comprises a headset or headphones, the processor 42 may generate and/or transmit the sensitive information in an audio format to be played to the user using the headset or headphones. In some embodiments, the processor 42 may transmit a portion (e.g., only a portion rather than the entirety of the sensitive information) of the uncensored sensitive information. For example, the processor 42 may transmit a text message that includes the first five numbers of a social security number. As such, in the event an unauthorized user views the text message, the unauthorized user is less likely to use the information as it may be difficult for the unauthorized user to determine the context of the first five numbers of the social security number. That is, the unauthorized user may not know that the five numbers are associated with a social security number. Additionally, the processor 42 may transmit the remaining four numbers to the external device 14 in a subsequent text message or the processor may transmit the remaining four numbers using a different external device 14 or display the remaining four numbers on the display of the computer device 12. In any case, transmitting at least a portion of the uncensored information to an external device 14 (e.g., an electronic device that is not the computing device 12) may prevent unwanted users from viewing and/or using the sensitive information as the context of the sensitive information may be unclear to the unauthorized user.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a processor;
a tangible, non-transitory, computer readable medium, comprising instructions that cause the processor to perform operations comprising:
    receiving an indication of content to be presented via a first device communicatively coupled to the processor, wherein the content comprises a plurality of characters;
    determining that the content comprises sensitive information;
    receiving sensor data from one or more sensor devices in response to determining that the content comprises the sensitive information;
    determining whether the first device is being utilized in a public location based on the sensor data;
    generating pseudo data in response to determining that the first device is being utilized in the public location;
    generating data indicating a time period when the pseudo data was generated, a geolocation where the pseudo data was generated, or both;
    censoring at least a first portion of the plurality of characters comprising the sensitive information using the pseudo data to generate censored content, wherein the pseudo data comprises a same format as at least the portion of content;
    determining a proximity of a third party relative to the first device;
    determining a second portion of the plurality of characters comprising a different number of characters as compared to the first portion based on the proximity of the third party relative to the first device;
    censoring the second portion of the content to generate updated censored content;

displaying the updated censored content via the first device;
    modifying a first format type of the at least the portion of the content comprising the sensitive information to a second format type different than the first format type, wherein the first format type comprises image data, text data, or both, and wherein the second format type comprises audio data; and
    presenting the sensitive information in the second format type via a second device.

2. The system of claim 1, wherein the operations comprise:
    receiving the indication of the content to be presented in response to a software application being accessed by the first device;
    determining a match between the software application and at least one software on a software application list stored in a memory accessible by the processor; and
    determining that the content comprises the sensitive information based on the match.

3. The system of claim 1, wherein the one or more sensor devices is configured to acquire audio data.

4. The system of claim 3, wherein the first device is determined to be utilized in the public location based on the audio data failing to match reference voice data associated with an authorized user of the first device.

5. The system of claim 1, wherein the one or more sensor devices is configured to acquire network data comprising a signal strength indicative of a wireless connection between the first device and the one or more sensor devices.

6. The system of claim 1, wherein the one or more sensor devices comprises an image capture device configured to acquire image data.

7. The system of claim 6, wherein the first device is determined to be utilized in public based on a portion of the image data not matching reference image data.

8. The system of claim 1, wherein the one or more sensor devices comprises a temperature sensor configured to measure temperature, wherein the sensor data comprises a measured temperature.

9. The system of claim 8, wherein the operations comprising determining whether the first device is being utilized in public by:
    comparing the measured temperature to a reference temperature, wherein the reference temperature is associated with a number of occupants in a room; and
    determining that the first device is being utilized in public based on the measured temperature exceeding the reference temperature.

10. The system of claim 1, wherein the content comprises image data, audio data, video data, or any combination thereof.

11. The system of claim 1, wherein the first device comprises an audio device, a display device, or any combination thereof.

12. The system of claim 1, wherein the data indicates the time period when the pseudo data was generated and the geolocation where the pseudo data was generated.

13. The system of claim 1, wherein the operations comprise:
    receiving an indication that the pseudo data was leaked; and
    determining a location where the pseudo data leaked based on the data.

14. The system of claim 1, wherein the second portion comprises 50% or greater of a total number of the plurality of characters.

15. A method, comprising:

receiving, via a processor, an indication of content to be presented via a first device communicatively coupled to the processor, wherein the content comprises a plurality of characters;

determining, via the processor, that the content comprises sensitive information;

receiving sensor data from one or more sensor devices in response to determining that the content comprises sensitive information;

determining, via the processor, whether the first device is being utilized in a public location based on the sensor data;

modifying, via the processor, a first format type of a portion of the content comprising the sensitive information to a second format type different than the first format type, wherein the first format type comprises image data, text data, or both, and wherein the second format type comprises audio data;

transmitting, via the processor, the sensitive information via the second format type to a second device, wherein the second device is configured to present the sensitive information via the audio data;

presenting the sensitive information in the second format type via the second device;

generating pseudo data in response to determining that the first device is being utilized in the public location;

generating data indicating a time period when the pseudo data was generated, a geolocation where the pseudo data was generated, or both;

censoring a first portion of the plurality of characters using the pseudo data to generate censored content, wherein the pseudo data comprises a same format as at least the portion of content;

determining a proximity of a third party relative to the first device;

determining a second portion of the plurality of characters comprising a different number of characters as compared to the first portion based on the proximity of the third party relative to the first device;

censoring the second portion of the content to generate updated censored content; and displaying the updated censored content via the first device.

16. The method of claim 15, wherein the censored content comprises a portion of the sensitive information.

17. The method of claim 15, wherein the sensor data comprises a measured temperature of a location where the first device is being utilized.

18. A tangible, non-transitory, machine-readable medium comprising instructions that, when executed by a processor, cause the processor to perform operations comprising:

receiving an indication of content to be presented via a first device communicatively coupled to the processor, wherein the content comprises a plurality of characters;

determining that the content comprises sensitive information;

collecting sensor data from one or more sensor devices in response to determining that the content comprises the sensitive information;

determining whether the first device is being utilized in a public location based on the sensor data;

modifying a first format type of a portion of the content comprising the sensitive information to a second format type different than the first format type, wherein the first format type comprises image data, text data, or both, and wherein the second format type comprises audio data;

transmitting the sensitive information via the second format type to a second device, wherein the second device is configured to present the sensitive information via the audio data; and presenting the sensitive information in the second format type via the second device;

generating pseudo data in response to determining that the first device is being utilized in the public location;

generating data indicating a time period when the pseudo data was generated, a geolocation where the pseudo data was generated, or both;

censoring a first portion of the plurality of characters using the pseudo data to generate censored content, wherein the pseudo data comprises a same format as at least the portion of content;

determining a proximity of a third party relative to the first device;

determining a second portion of the plurality of characters comprising a different number of characters as compared to the first portion based on the proximity of the third party relative to the first device;

censoring the second portion of the content to generate updated censored content; and displaying the updated censored content via the first device.

19. The tangible, non-transitory, machine-readable medium of claim 18, wherein the instructions that cause the processor to modify the first format type of the portion of the content comprises:

identifying the first format for presenting the censored content using the first device; and generating the censored content based on the identified first format.

20. The tangible, non-transitory, machine-readable medium of claim 18, wherein the one or more sensors comprise audio sensor device, and wherein the sensor data comprises audio data; and wherein the instructions that cause the processor to determine that the first device is being utilized in the public location comprises determining that first sound characteristics of the audio data fail to match reference voice data associated with an authorized user of the first device.

* * * * *